Feb. 7, 1967 J. M. SACKS 3,303,434
SWEEP CIRCUIT FOR A FREQUENCY LOCKED CIRCUIT
Filed Dec. 31, 1963 4 Sheets-Sheet 1

INVENTOR.
JACOB M. SACKS
BY [signature]
AGENT

Feb. 7, 1967 J. M. SACKS 3,303,434

SWEEP CIRCUIT FOR A FREQUENCY LOCKED CIRCUIT

Filed Dec. 31, 1963 4 Sheets-Sheet 2

INVENTOR.
JACOB M. SACKS
BY [signature]
AGENT

INVENTOR.
JACOB M. SACKS
BY [signature]
AGENT

Feb. 7, 1967 J. M. SACKS 3,303,434

SWEEP CIRCUIT FOR A FREQUENCY LOCKED CIRCUIT

Filed Dec. 31, 1963 4 Sheets-Sheet 4

INVENTOR.
JACOB M. SACKS
BY [signature]
AGENT

United States Patent Office 3,303,434

Patented Feb. 7, 1967

3,303,434

SWEEP CIRCUIT FOR A FREQUENCY LOCKED CIRCUIT

Jacob M. Sacks, Palos Verdes Estates, Calif., assignor to TRW Inc., a corporation of Delaware Filed Dec. 31, 1963, Ser. No. 334,885
6 Claims. (Cl. 331—111)

This invention relates generally to a locking circuit for use with a very stable oscillator and more particularly to lock acquisition circuitry for use with gas frequency standards that employ an optical pumping lamp in combination with a gyromagnetic medium for establishing a constant frequency output signal.

Masers, gas cell frequency standards, atomic clocks and the like utilize the absorption, transmission, and emission characteristics of a resonant medium as a basis for establishing a control signal. In such applications, it is often necessary to induce the particles comprising a resonant medium to occupy preselected quantum energy levels resulting in an overpopulation of a first preselected quantum energy level as compared with a second preselected quantum energy level. Since the energy separation between these two quantum energy levels is accurately known, transitions from the overpopulated level to the other level provide a resonance condition for deriving the control signal.

The preferred method of achieving this overpopulation condition is by a process termed optical pumping. In this process, an optical pumping light beam containing electromagnetic radiation having energy in a preselected wavelength traverses the resonant medium at a wavelength corresponding to a particular quantum energy transition of the resonant medium. The resonant medium absorbs energy from the optical pumping light beam and thereby the particles comprising the resonant medium are induced to occupy preselected quantum energy levels in which there is a greater population of particles in one of the two preselected quantum energy levels than the other. Therefore, as the population difference is increased, the control signal definition is enhanced. It has been found that the more monochromatic the optical pumping light beam is in the preselected wavelength, the more efficient is the optical pumping process in inducing the overpopulation described above. Filtering techniques using isotopes of the resonant medium are used to eliminate undesired wavelengths from the optical pumping light to thereby achieve the desired monochromatic wavelength. When the cell is illuminated by microwave energy of the atomic resonant frequency, a further redistribution of the atoms occurs and replenishes the energy level depleted by optical pumping. The microwave transition thus competes with the optical pumping process which causes the optical pumping to continue at an increased rate so that an increased amount of pumping light is absorbed by the rubidium 87. When the microwave frequency corresponds to the desired energy transition of the rubidium 87, the pumping light transmitted through the cell is at a minimum. The intensity of the transmitted pumping light is monitored by a photo detector, which supplies a signal to the oscillator control circuits to maintain the proper frequency in the crystal oscillator. With the microwave energy at the resonance frequency, the amount of pumping light transmitted through the cell will decrease since more of the light is absorbed by the atoms in the cell. The amount of light transmitted through the cell monitors the action of the microwave signal. If the microwave signal is slowly swept in frequency through the resonant frequency, the light transmitted through the cell exhibits the characteristic resonant line shape, and will have a minimum when the microwave frequency corresponds to the atomic resonant frequency.

This invention is concerned with the automatic starting of the pumping lamp and the coincidence of the microwave energy signal frequency with the atomic resonant frequency to indicate a locked condition.

Further advantages and objectives of this invention will be made more apparent by referring to the accompanying drawings wherein.

Figure 1:
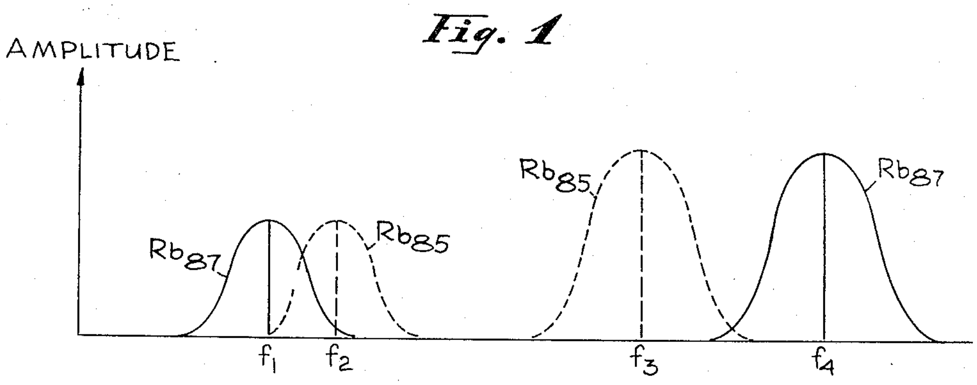
FIG. 1 illustrates the spectral frequency emissions from the excited atoms of $Rb_{87}$ and $Rb_{85}$.
Figure 2:
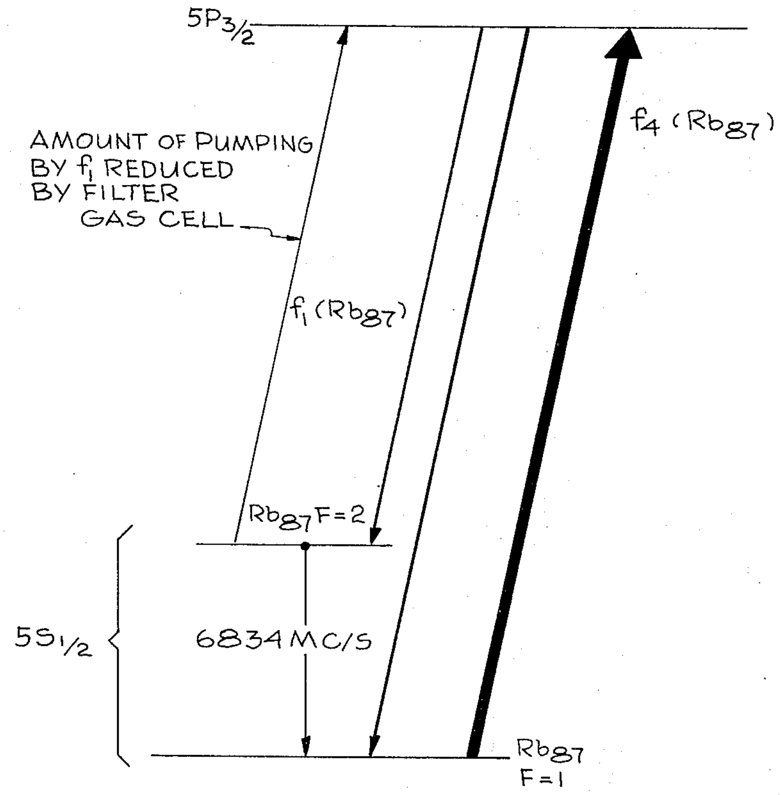
FIG. 2 is a simplified diagram representing the energy levels of an atom of $Rb_{87}$.

When electromagnetic radiation in the form of an optical pumping light beam, which contains photons having energy in a wavelength equivalent to $f_4$, as shown in FIG. 1, impinges on a collection of $Rb_{87}$ atoms in the $5S_{1/2}$ ground energy state, illustrated in FIG. 2, those atoms in the magnetic substates of the $F=1$ level of the $5S_{1/2}$ ground state are temporarily raised to the $5P_{1/2}$ first optically excited state. Upon a drop down transition to the $5S_{/12}$ state, the atoms may occupy positions in the magnetic substates of either the $F=2$ or $F=1$ levels of the $5S_{1/2}$ state. Electromagnetic radiation having a wavelength equal to $f_4$ and $f_1$ is emitted from the $Rb_{87}$ during these drop down transitions. In FIG. 2, the thickness of the lines between energy levels indicates the relative amount of atoms that are pumped. As this optical pumping process continues, there is a depletion of the number of atoms in the $F=1$ level of the $5S_{1/2}$ state and an increase in the number of atoms in the $F=2$ level of the $5S_{1/2}$ state which tends to provide the desired overpopulation condition. At the same time, however, the optical pumping light beam contains photons having energy in a wavelength equivalent to $f_1$, tending to depump the magnetic substates at the $F=2$ level of the magnetic substates of the $F=1$ level. In other words, the pumping action of $f_1$ and $f_4$ would be nullified. Therefore, to achieve a population difference, for example, by having more atoms in the $F=2$ level than in the $F=1$ level, it is necessary that the optical pumping light beam be filtered. The degree of population difference that can be achieved is thus a net effect and the more monochromatic the optical pumping light beam is in $f_4$, compared with $f_1$, the greater will be the population difference which will result in a stronger resonance signal between these two energy levels.

The energy levels of interest in practicing this invention are associated with the spectral frequencies of $Rb_{87}$, identified as $f_1$ and $f_4$ in FIG. 1. A review of the emission characteristics of $Rb_{85}$, which are illustrated as frequency $f_2$ and $f_3$ in FIG. 1, shows a substantial overlap as determined by the amount of buffer gas pressure in the bandwidth characteristics of $f_1$ in $Rb_{87}$ and $f_2$ in $Rb_{85}$. This phenomenon is utilized by constructing a filter cell containing $Rb_{85}$ as the means for reducing the intensity of the $f_1$ emission of $Rb_{87}$.

Referring now to FIG. 2, there are illustrated the energy levels associated with $Rb_{87}$. These levels exist in the presence of an applied weak unidirectional magnetic field that induces Zeeman splitting. When Zeeman splitting occurs, the $5S_{1/2}$ ground energy state includes those quantum levels identified as $F=1$ and $F=2$. In the practice of this invention the $5S_{1/2}$ ground state is made use of by pumping the atoms to the excited state identified as $5P_{3/2}$. The transition between the $F=1$ and $F=2$ of the $5S_{1/2}$ ground state is 6843 megacycles (mc.) and provides the resonant condition for establishing a control signal. The pumping effected by frequency $f_1$ of $Rb_{87}$ is substantially reduced by means of the gas filter cell absorbing the frequency $f_2$ of $Rb_{85}$.

Figure 3:
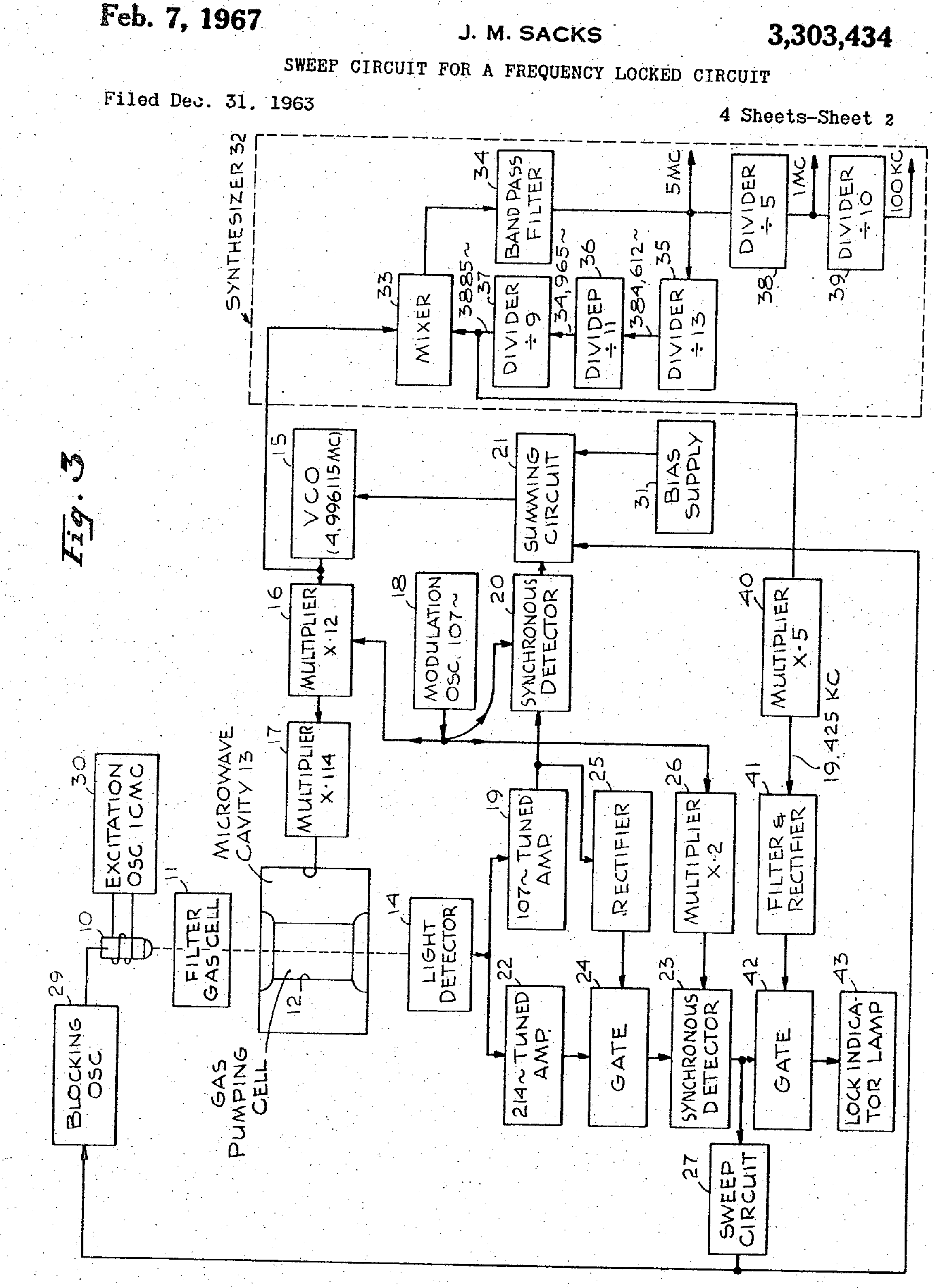
FIG. 3 is a block diagram of a frequency standard.

Referring now to FIG. 3, there is shown a block diagram of a frequency standard comprising an optical pumping lamp 10, containing $Rb_{87}$. The light output of the optical pumping lamp 10 contains frequencies $f_1$ and $f_4$, as illustrated in FIG. 1. The light beam is adapted to pass through a filter gas cell 11, containing $Rb_{85}$. As previously explained in connection with FIGS. 1 and 2, the intensity of $f_1$ is reduced by the absorption effect of the $f_2$ frequency generated by the $Rb_{85}$ and contained in the filter gas cell 11. As a result of this filtering action, the light passing through the gas filter cell 11 may be considered monochromatic, which we have defined as having a spectral emission of $f_4$ that is substantially greater than the spectral emission of $f_1$. The filtered beam of light now containing principally $f_4$ is caused to pass through a gas pumping cell 12, containing $Rb_{87}$. Transverse of the gas pumping cell 12 is a microwave cavity 13 that is tunable to the transition frequency between the $F=1$ and $F=2$ energy levels of the $5S_{1/2}$ ground state. For $Rb_{87}$ this transition frequency is equal to 6834 mc./sec., which is the frequency to which the microwave cavity 13 is tuned. The action of the light in passing through the gas pumping cell 12 causes an absorption of energy from the light source by the atoms of $Rb_{87}$, as they are raised to the $5P_{3/2}$ energy state. This absorption of energy is detected by means of a light detector 14 as a change in the intensity of the light beam. The output of the light detector 14 is fed to a suitable amplifier 15, the output of which represents an amplified signal indicating an absorption at the detected frequency $f_4$.

If the microwave energy fed into the microwave cavity 13 is first generated at 4.996115 mc. in a voltage-controlled oscillator (VC), which frequency is the 1368th subharmonic of the rubidium 87 frequency of 6835 mc., the output of the VCO 15 is multiplied in an ×.12 multiplier 16 to approximately 59.995 mc. (114th subharmonic) which is then multiplied in a varactor multiplier 17 by a factor of ×.114 for application to the microwave cavity 13, which supplies sufficient energy to almost saturate the atomic transition in the rubidium 87 cell. The microwave energy fed into the microwave cavity 13 is frequency modulated at the rate of 107 cycles by means of a 107 cycle oscillator 18. When the microwave excitation is at the atomic resonant frequency, the pumping light transmitted through the gas pumping cell undergoes the intensity change which serves as the control signal. The 107 c.p.s. modulation of the microwave frequency around the resonant frequency produces an amplitude modulation of the light intensity monitored by the light detector 14. The audio frequency signal of 107 c.p.s. is amplified in a 107 c.p.s. tuned amplifier 19 and compared with the 107 c.p.s. reference oscillator signal in a synchronous detector 20.

Figure 4:
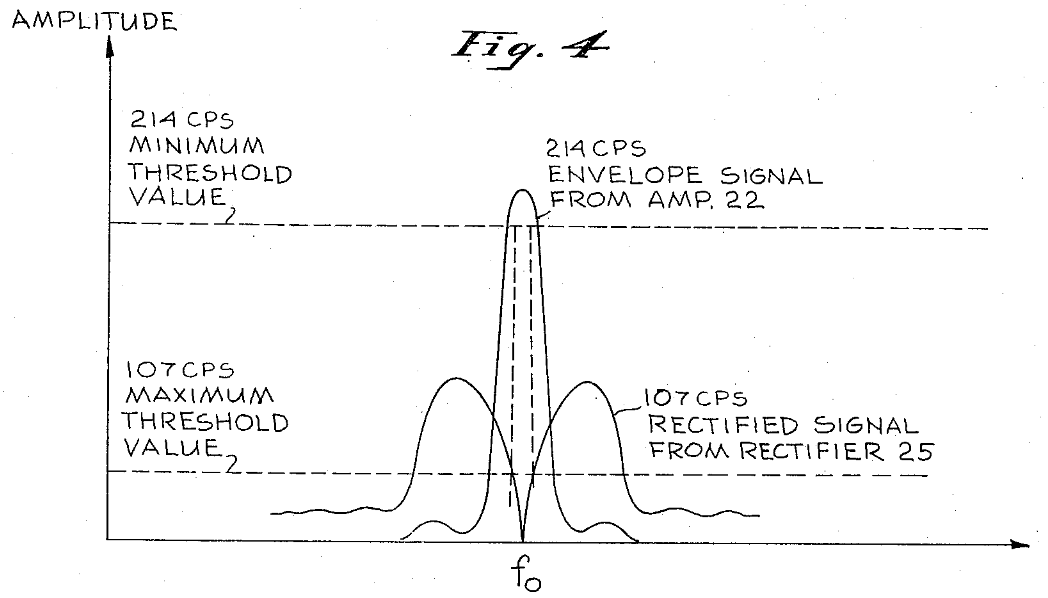
FIG. 4 is a waveform illustrating the 107 c.p.s. and 214 c.p.s. signals.
Figure 5:
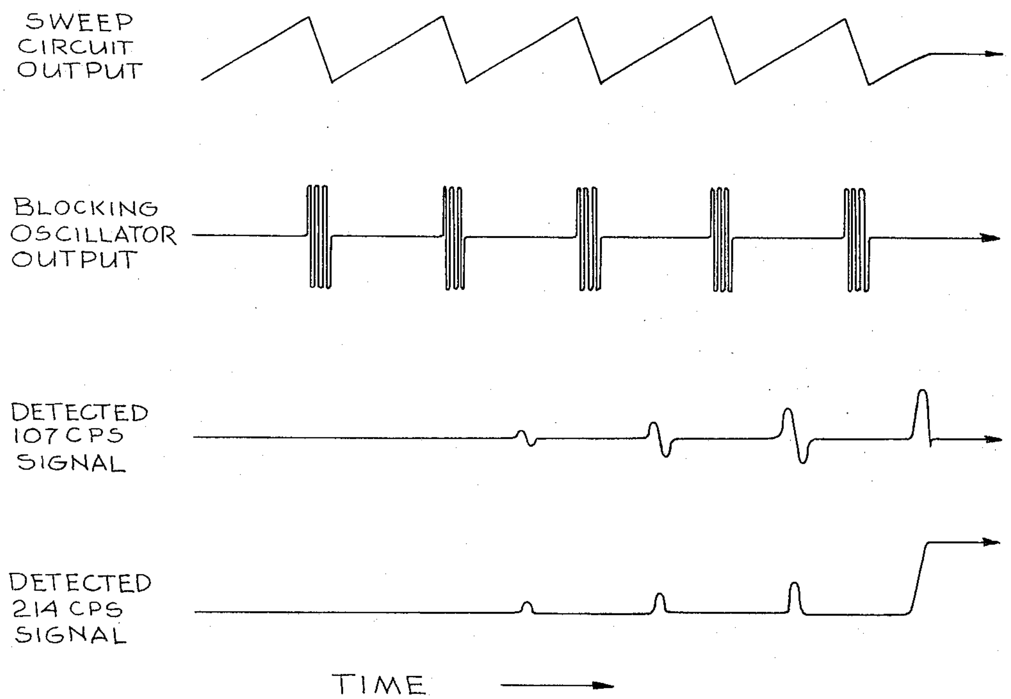
FIG. 5 is a series of waveforms illustrating the starting sequence.

The output of the synchronous detector 20 is a frequency control D.C. voltage which is zero when the crystal controlled VCO 15 is exactly at the 1368th subharmonic of the atomic resonance frequency, and which has one sign when the frequency is above and the opposite sign when the frequency is below the desired value. This output D.C. voltage is applied through a summing circuit 21 to a variable capacitor in the VCO 15 oscillator circuit to shift the oscillator frequency to the desired point. As the frequency of the VCO 15 is stabilized so as to produce a resonant frequency in the microwave cavity 13 substantially equal to the atomic resonant frequency of the rubidium 87 in the gas pumping cell 12, the absorption phenomenon will result in a decrease in the 107 c.p.s. signal being detected in the amplifier 19. With the microwave energy at resonancy as indicated by a decrease in the 107 c.p.s. signal, a resulting 214 c.p.s. signal is generated and detected by a 214 c.p.s. tuned amplifier 22 and fed to a synchronous detector 23 through a gate 24. The output of the 107 c.p.s. tuned amplifier is rectified in a rectifier 25 to produce a D.C. voltage that is used to control the passing of the 214 c.p.s. signal through the gate 24. In the embodiment the output signal from the rectifier 25 is used to prevent the passage of any signal from the 214 c.p.s. tuned amplifier 22. FIG. 4 illustrates the effect of setting a maximum threshold for the 107 c.p.s. signal. Since the present explanation assumes a locked condition, the output from the rectifier 25 will be below the set threshold level and the 214 c.p.s. signal will be fed to the synchronous detector 23. The 107 c.p.s. signal from the amplifier 19 is fed to the synchronous detector 20, thereby providing fine frequency control by changing the D.C. voltage feeding the summing circuit 21. The result is that at lock the 107 c.p.s. signal has a fine control on the frequency change of the VCO 15. The reference signal for the synchronous detector 23 is obtained from the 107 c.p.s. modulation oscillator 18 after the reference signal is multiplied in an ×.2 multiplier, thereby producing a reference 214 c.p.s. signal that is a phase coherent with the detected 214 c.p.s. signal. The output of the synchronous detector 23 is a D.C. signal fed to a free-running sweep circuit 27 for stopping the output voltage from sweeping. FIG. 5 illustrates the relationship between the sweep voltage and the detection of the 107 c.p.s. and 214 c.p.s. signals. In the presence of a 214 c.p.s. signal the sweep voltage from the sweep circuit 27 is cut off, thereby removing the sweep voltage from affecting the output of the VCO 15. The output of the sweep circuit 27 is also fed to a blocking oscillator 29 that controls the starting of the lamp 10. In the normal operating case the lamp 10 is maintained in an ionized state by an excitation oscillator 30; however, when the equipment is cold and there is no detected 214 c.p.s. signal, the sweep circuit 27 is free running. During each sweep, as the sweep voltage approaches a maximum, the blocking oscillator 29 is turned on, which results in a series of lamp starter pulses being fed to the lamp 10.

Once the 214 c.p.s. signal is detected, an output appears at the synchronous detector 23 which stops the sweep voltage since the lamp must be assumed to have started to result in a detected 214 c.p.s. signal. Removal of the sweep voltage from the summing circuit 21 allows the detected 107 c.p.s. signal to provide fine tuning control over the VCO 15. A suitable bias supply 31 is also connected to the summing circuit for maintaining the frequency controlling voltage fed to the VCO 15 during the locked condition. The fine tuning controlled by the detector 20 actually varies the tuning voltage about the adjusted bias supply.

A review of the starting sequence in connection with the waveforms shown in FIG. 5 will show that turning on the system of FIG. 4 causes the free running sweep circuit 27 to generate a sawtooth voltage. In addition, certain obvious temperature-controlled ovens such as associated with the VCO 15 and the microwave optical unit are turned on. These temperature-controlled circuits are each thermostatically controlled and do not independently control the lock circuit being described and hence are not illustrated. The sweep voltage is applied to the summing circuit 21 for coarse sweeping of the VCO 15 and also to cause the blocking oscillator 29 to generate a series of lamp starting pulses. After a period of time required by the individual units to arrive at their generating temperature and the eventual starting of the lamp 10, a 107 c.p.s. signal will be detected in the presence of increased illumination from the lamp 10 as the signal-to-noise ratio increases. Practical demonstrations show that a unit requires approximately 45 minutes to warm up from 25° C. The sawtooth voltage may seep at a rate approximating one cycle per minute to cause a frequency change of ±3 c.p.s. in the VCO 15. It is estimated that 15 to 20 minutes is necessary for the lamp 10 to achieve sufficient intensity for optical pumping to begin.

During lock the 107 c.p.s. signal is providing fine frequency control of the VCO 15, as shown in FIG. 4, between the limits as determined by the present threshold value. The detected 214 c.p.s. signal is synchronously detected against a reference 214 c.p.s. signal in the detector 23 for stopping the sweep voltage from affecting the summing circuit 21 and the frequency of the VCO 15 is now locked to the atomic resonant frequency.

A usable output from the system is achieved by translating the loop controlled oscillator frequency from the VCO 15 to frequencies of more general usage in a synthesizer 32. The locked frequency of the VCO 15 is 4.996115 mc. which is translated in the synthesizer 32 to yield outputs of 5 mc., 1 mc. and 100 kc. The frequency output from the VCO 15 is fed to a mixer 33 which also receives an input signal of 3,885 c.p.s. The 5 mc. output is obtained by adding the 3.885 kc. to 4.996115 mc. in the mixer 33 and passing the 5 mc. sideband through a bandpass filter 34. The 3.885 kc. is derived by the regenerative action of the loop which consists of the mixer 33, the 5 mc. bandpass filter 34 and a 1287 divider consisting of dividers 35, 36 and 37. The dividers are free running oscillators that are injection frequency locked in succession around the loop. The initial free running frequencies are set near the lock-in-frequencies; i.e., 384,615 c.p.s. for the divide by thirteen (13) stage 35, 34,965 c.p.s. for the divide by eleven (11) stage 36, and 3885 c.p.s. for the divide by nine (9) stage 37.

The 1 mc. and 100 kc. outputs are obtained using the same type of divider states 38 and 39. There is no need for the regenerative loop in obtaining these outputs as they are derived directly from the 5 mc. output as shown on the block diagram.

As will be apparent, the output signals of 5 mc., 1 mc. and 100 kc. are phase coherent and locked to the VCO 15, the 3.885 kc. signal from the divider 37 is fed to an $\times .5$ multiplier 40 which generates a signal of 19.425 kc. A crystal filter and rectifier stage 41, having a passband of $\pm 1$ cycle, produces a D.C. signal whenever the input signal is within the passband characteristics of the crystal filter. An AND gate 42 receives the D.C. output from the filter and rectifier stage 41 and the D.C. signal resulting from the 214 c.p.s. signal feeding the detector 23. The gate 42 is adjusted to pass a D.C. signal resulting from a minimum threshold value of 214 c.p.s. signal as illustrated in FIG. 4. In the presence of a 214 c.p.s. signal and a synthesizer generated signal the gate 42 will energize a lock indicator lamp 43 or any other suitable control circuit to thereby indicate that the search sweep has stopped and that the synthesizer is producing the correct output frequencies.

Figure 6:
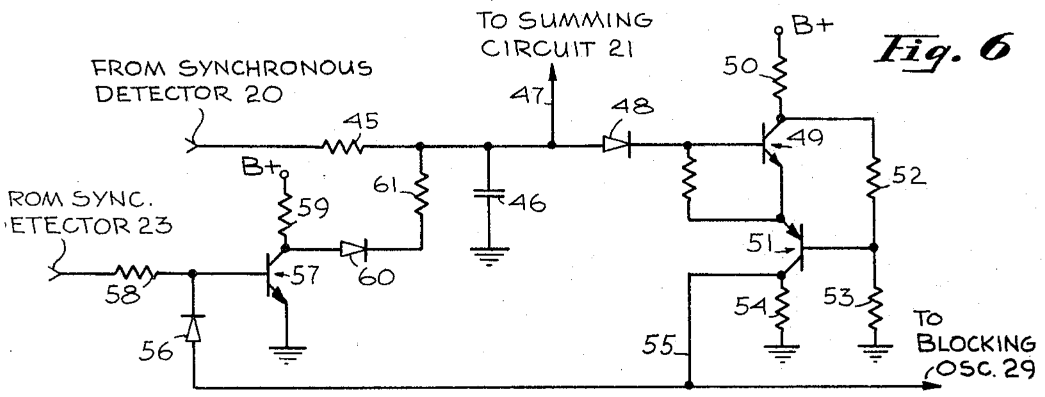
FIG. 6 is a schematic diagram of a simplified sweep and locking circuit.

Referring now to the schematic diagram of FIG. 6, there is shown a preferred simplified frequency lock acquisition circuit that performs the functional requirements illustrated in FIG. 3 but with a minimum of components. The problem being solved concerns itself with a system that is turned ON after a long period of inactivity which has allowed the VCO 15 (FIG. 4) to become cold thereby locating the frequency of oscillation far removed from the atomic resonant frequency. The circuit is best understood by assuming the system has been turned on after a long period of inactivity and the VCO frequency is far enough removed from the gas cell frequency so there is no tendency for the system to drift into lock.

The output of the synthesizer or lock indicator circuit is therefore zero. Since there is no 214 c.p.s. signal, there is no output from the 214 c.p.s. synchronous detector feeding the low pass filter combination of a resistor 45 and a capacitor 46. The voltage developed across capacitor 46 is connected to the summing circuit by a line 47. There is no change in the capacitor 46 voltage since there is no frequency error signal.

A diode 48 connected in series with the base lead of an NPN transistor 49 and the capacitor 46 will not conduct since the transistor is cut off and there is no forward bias across the diode 48, hence no forward current flows. The collector of the transistor 49 is connected through a resistor 50 to a B+ source of potential. Since transistor 49 is not conducting base current will not flow and hence there will be no current through resistor 50. No current can flow through a PNP transistor 51 connected in circuit with the transistor 49, since the emitter of transistor 51 is attached to the emitter of transistor 49 and the base of transistor 51 is connected at one end through a resistor 52 to the collector of transistor 49 and at the other end to ground through a resistor 53. The voltage at the junction of the collector of transistor 49 and resistor 50 is near B+, insuring that the base of transistor 51, the emitter of transistor 51 and the emitter of transistor 49 are positive with respect to ground. The voltage at the base of transistor 49 is determined by the values of resistors 52 and 53. The collector of transistor 51 and a resistor 54 is connected from ground by a line 55 to the blocking oscillator 29 (FIG. 4) and to a diode 56. The diode 56 to the base of an NPN transistor 57, which also receives an input to the base from the synthesized output through a resistor 58. The emitter is grounded and the collector connected to B+ through a resistor 59 and also to a diode 60. The diode 60 is connected through a resistor 61 between the resistor 45 and the capacitor 46. As mentioned previously, transistors 49 and 51 are cut off and hence no voltage is developed across resistor 54 resulting in no forward current through diode 56. Therefore there is no base current in NPN transistor 57 which remains cutoff. There is no collector current through resistor 59, therefore the collector of transistor 57 remains near B+.

Figure 7:
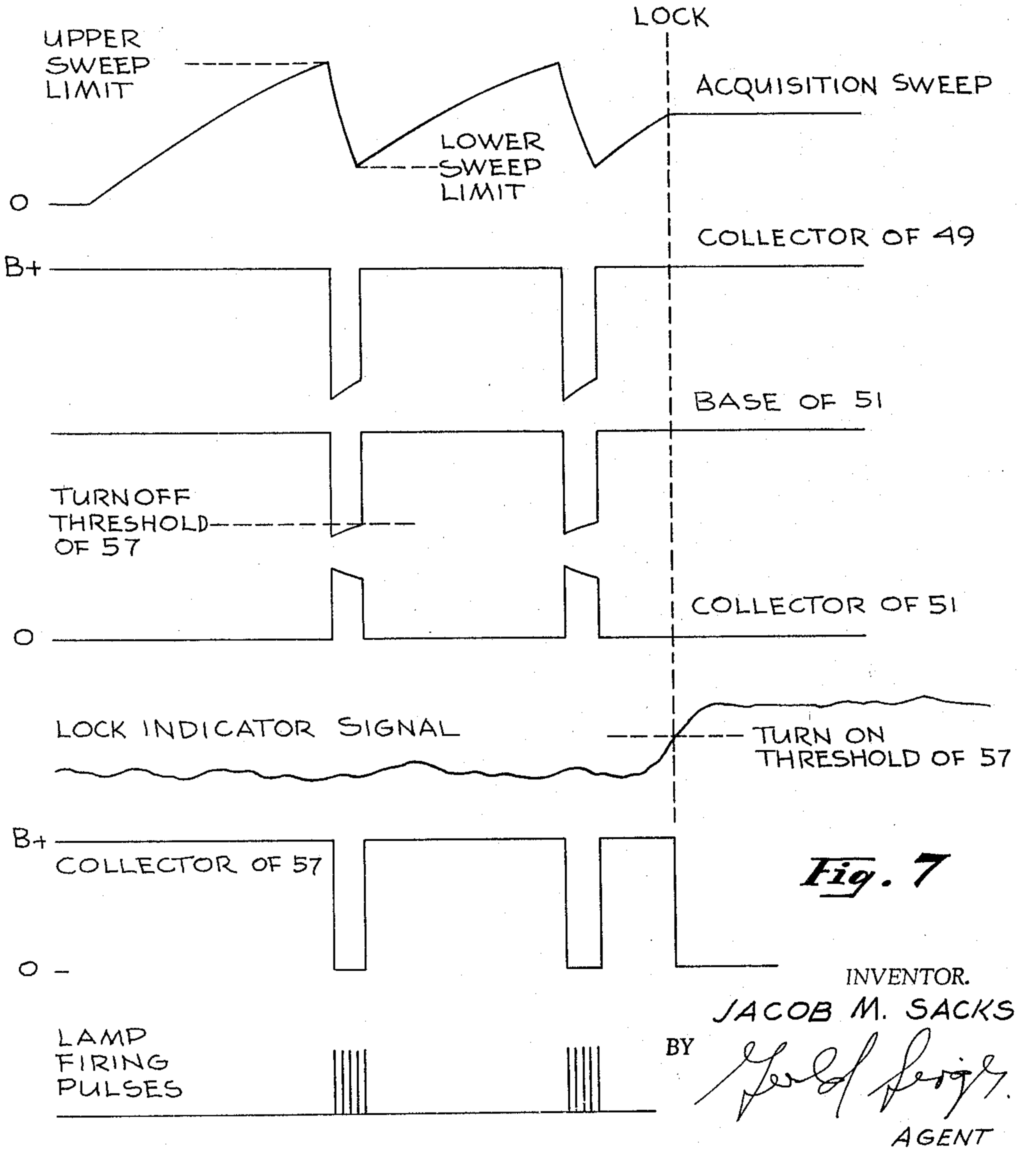
FIG. 7 is a series of waveforms associated with FIG. 6.

A small current flows from B+ through resistor 59, diode 60, and resistor 61 into capacitor 46. It is assumed that the resistance of resistor 45 is much greater than the combined resistances of resistor 59, diode 60, and resistor 61. Therefore as capacitor 46 charges the voltage rises exponentially toward B+, as shown in FIG. 7.

At some point in time, the voltage across capacitor 46 is high enough to turn on diode 48 and the base emitter diodes of transistors 49 and 51. The time at which this occurs will be a function of the time constant of capacitor 46, resistor 61 and resistor 59, considered as an RC filter, and of the voltage breakdown point established by resistors 52 and 53.

Turning on the bases of transistors 49 and 51 turns on collector current in transistors 49 and 51, said current flowing through resistors 50 and 54. Regenerative action from the collector of transistor 49 through resistors 52 and 53 to base of transistor 51 maintains conduction.

Capacitor 46 now rapidly discharges through diode 48 and the base-emitter diodes of transistors 49 and 51 and through resistor 54 to ground, and the voltage across capacitor 46 falls rapidly. Meanwhile during discharge, a positive voltage appears across resistor 54, turning on diode 56 and pulling transistor 57 into saturation. The collector of transistor 57 drops to almost ground potential, turning off diode 60 since its cathode is positive, thereby insuring that capacitor 46 can not charge through resistor 59. This action insures that the capacitor 46 must discharge all the way to the end of its discharge cycle, and the system can not "hang up" during discharge because of noise or other disturbances. When the voltage across capacitor 46 drops to a sufficiently low value to cut off diode 48 (this value is a function of the voltage at the junction of resistors 52 and 53 during the discharge period), the charging cycle of capacitor 46 begins anew. This process continues to repeat itself until the lock indicator signal stops it.

The lock indicator signal is a D.C. output signal derived from the 214 c.p.s. synchronous detector. At the time of coincidence of the frequencies of the gas cell and the VCO, which is being swept by the exponential sawtooth across capacitor 46 being applied through line 47, the lock indicator signal causes current to flow through a resistor 58 into the base of transistor 57, saturating the transistor. This can only occur during the charge period of capacitor 46 since the lock indicator signal is filtered heavily and can not build up sufficiently during the rapid discharge period of the capacitor. Collector saturation of transistor 57 grounds the anode of the diode 60, thereby turning off the charging current for capacitor 46. Therefore the acquisition sweep terminates and the capacitor 46 is left charged to the proper voltage to hold the VCO frequency to that of the gas cell. The charge and discharge of capacitor 46 which is now accomplished through resistor 61 and the 107 c.p.s. detector and the loop is effectively locked. It can now be appreciated that capacitor 46 is in fact the summing circuit shown in FIG. 3. A review of FIG. 7 will show the waveform described in the present explanation.

The sweep circuit is isolated from the 107 c.p.s. loop by the diode 48 back resistances of the order of thousands of megohms. The entire sweep acquisition circuit remains inactive during normal operation and can not interfere with the frequency locked loop. Only a loss of the 214 c.p.s. lock can initiate the acquisition sweep. A voltage pulse can be taken from resistor 54 during discharge and applied as a trigger on line 55 to the rubidium lamp starting circuit. Each time capacitor 46 discharges the lamp starting circuit fires until the lamp is lighted. Thus the sweep action can not be terminated before the lamp is lit.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

I claim:

1. In combination,
   a frequency controlling circuit comprising a charging capacitor whereby the capacitor voltage is adapted to control the frequency of a voltage controlled oscillator,
   means operatively connecting said capacitor for applying a first control voltage to vary said capacitor voltage whereby the voltage controlled oscillator is fine frequency controlled,
   a charging circuit including a switch operatively connecting said capacitor for charging said capacitor at a rapid rate whereby a sweeping voltage is generated across said capacitor resulting in a sweeping frequency voltage,
   an additional switch means responsive to a substantially high voltage portion of said sweeping voltage for discharging said capacitor, thereby sweeping the frequency of the voltage controlled oscillator,
   means operatively connecting said capacitor responsive to the discharging of said capacitor for applying a signal to said charging circuit to disable said charging circuit, thereby preventing said capacitor from charg-again until the discharge is complete, and
   means responsive to a lock indicator signal for energizing said charging circuit, to disable the charging of said capacitor and enabling the first control voltage to vary the voltage controlled oscillator.

2. In an optical lamp pumping system cooperating with a source of microwave energy for locking the frequency of the microwave energy to the atomic resonant frequency, a frequency search and locking circuit comprising
   a frequency controlling circuit comprising a charging capacitor whereby the capacitor voltage is adapted to control the frequency of a voltage controlled oscillator,
   means operatively connecting said capacitor for applying a first control voltage to vary said capacitor voltage whereby the voltage controlled oscillator is fine frequency controlled,
   a charging circuit including a switch-operatively connecting said capacitor for charging said capacitor at a rapid rate whereby a sweeping voltage is generated across said capacitor resulting in a sweeping frequency voltage,
   an additional switch means responsive to a substantially high voltage portion of said sweeping voltage for discharging said capacitor, thereby sweeping the frequency of the voltage controlled oscillator,
   means operatively connecting said capacitor responsive to the discharging of said capacitor for applying a signal to charging circuit to disable said charging circuit and to impulse the optical lamp, thereby preventing said capacitor from charging again until the discharge is complete and insuring the starting of the lamp, and
   means responsive to a lock indicator signal for energizing said charging circuit, to disable the charging of said capacitor and enabling and the first control voltage to vary the voltage controlled oscillator.

3. In combination,
   a frequency controlling circuit comprising a charging capacitor whereby the capacitor voltage is adapted to control the frequency of a voltage controlled oscillator,
   means operatively connecting said capacitor for generating a first control voltage arranged to vary said capacitor voltage whereby the voltage controlled oscillator is fine frequency controlled,
   a charging circuit including a normally cutoff transistor circuit operatively connecting said capacitor for charging said capacitor at a rapid rate whereby a sweeping voltage is generated across said capacitor resulting in a sweeping frequency voltage, said transistor not affecting said charging circuit when cut off,
   a switch means responsive to a substantially high voltage portion of said sweeping voltage for discharging said capacitor, thereby sweeping the frequency of the voltage controlled oscillator,
   means operatively connecting said capacitor responsive to the discharging of said capacitor for energizing said transistor, thereby preventing said capacitor from charging again until the discharge is complete, and
   means responsive to a lock indicator signal for energizing said transistor, whereby the charging of said capacitor is prevented and the control voltage is allowed to vary the voltage controlled oscillator.

4. In combination,
   a frequency controlling circuit comprising a charging capacitor whereby the capacitor voltage is adapted to control the frequency of a voltage controlled oscillator,
   means operatively connecting said capacitor for generating a first control voltage arranged to vary said capacitor voltage whereby the voltage controlled oscillator is fine frequency controlled,
   a charging circuit including a switch operatively connecting said capacitor for charging at a rapid rate said capacitor whereby a sweeping voltage is generated across said capacitor resulting in a sweeping frequency voltage,
   a normally cut off transistor circuit responsive to a predetermined high value of capacitor voltage for causing the transistor circuit to conduct, thereby discharging said capacitor,
   means operatively connecting said capacitor responsive to the discharging of said capacitor for energizing said switch, thereby preventing said capacitor from charging again until the discharge is complete, and
   means responsive to a lock indicator signal for energizing said switch, whereby the charging of said capacitor is prevented and the first control voltage is allowed to vary the voltage controlled oscillator.

5. In combination, a frequency controlling circuit comprising a charging capacitor whereby the capacitor voltage is adapted to control the frequency of a voltage controlled oscillator, means operatively connecting said capacitor for generating a first control voltage arranged to vary said capacitor voltage whereby the voltage controlled oscillator is fine frequency controlled, a charging circuit including a normally cutoff transistor for charging said capacitor at a rapid rate whereby a sweeping voltage is generated across said capacitor resulting in a sweeping frequency voltage, said cutoff transistor not affecting said charging circuit when cut off, a normally nonconducting transistor circuit operatively connecting said capacitor responsive to a predetermined high value of capacitor voltage for causing the nonconducting transistor circuit to conduct, thereby discharging said capacitor, means operatively connecting said capacitor responsive to the discharging of said capacitor for energizing said normally cutoff transistor, thereby preventing said capacitor from charging again until the discharge is complete, and means responsive to a lock indicator signal for energizing said normally cutoff transistor, whereby the charging of said capacitor is prevented and the control voltage is allowed to vary the voltage controlled oscillator.

6. In an optical lamp pumping system cooperating with a source of microwave energy for locking the frequency of the microwave energy to the atomic resonant frequency, a frequency search and locking circuit comprising a frequency controlling circuit comprising a charging capacitor whereby the capacitor voltage is adapted to control the frequency of a voltage controlled oscillator, means operatively connecting said capacitor for generating a first control voltage arranged to vary said capacitor voltage whereby the voltage controlled oscillator is fine frequency controlled, a charging circuit including a normally cutoff transistor operatively connecting said capacitor for charging said capacitor at a rapid rate whereby a sweeping voltage is generated across said capacitor resulting in a sweeping frequency voltage, said cutoff transistor not affecting said charging circuit when cut off, a normally nonconducting transistor circuit responsive to a predetermined high value of capacitor voltage for causing the nonconducting transistor circuit to conduct, thereby discharging said capacitor, means operatively connecting said capacitor responsive to the discharging of said capacitor for energizing said cutoff transistor and adapted to impulse the optical lamp, thereby preventing said capacitor from charging again until the discharge is complete and insuring the starting of the lamp, and means responsive to a lock indicator signal for energizing said cutoff transistor, whereby the charging of said capacitor is prevented and the control voltage is allowed to vary the voltage controlled oscillator.

References Cited by the Examiner

UNITED STATES PATENTS 3,074,028 1/1963 Mammano --------- 331—111

ROY LAKE, *Primary Examiner.*

J. B. MULLINS, *Assistant Examiner.*